(12) United States Patent
Weng

(10) Patent No.: US 11,772,570 B2
(45) Date of Patent: Oct. 3, 2023

(54) STABLE BICYCLE CARRIER AT REAR END OF VEHICLE

(71) Applicant: Ningbo Eatripway Auto Products Co., Ltd., Zhejiang (CN)

(72) Inventor: Yechi Weng, Zhejiang (CN)

(73) Assignee: Ningbo Eatripway Auto Products Co., Ltd., Zhejiang (CN)

( * ) Notice: Subject to any disclaimer, the term of this patent is extended or adjusted under 35 U.S.C. 154(b) by 0 days.

(21) Appl. No.: 18/103,520

(22) Filed: Jan. 31, 2023

(65) Prior Publication Data

US 2023/0242045 A1 Aug. 3, 2023

(30) Foreign Application Priority Data

Jan. 31, 2022 (CN) .......................... 202220247563.0
Oct. 26, 2022 (CN) .......................... 202222850275.7

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................... B60R 9/10; B60R 9/06
See application file for complete search history.

(56) References Cited

U.S. PATENT DOCUMENTS

| | | | | |
|---|---|---|---|---|
| 6,244,483 B1 * | 6/2001 | McLemore | ............... | B60R 9/10 224/521 |
| 6,491,195 B1 * | 12/2002 | McLemore | ............... | B60R 9/10 224/521 |
| 6,857,545 B2 * | 2/2005 | McLemore | ............... | B60R 9/10 224/520 |
| 11,148,607 B1 * | 10/2021 | Hsieh | ...................... | B60R 9/045 |
| 11,628,777 B2 * | 4/2023 | Huang | ...................... | B60R 9/06 224/569 |
| 2007/0251964 A1 * | 11/2007 | Gunn | ......................... | B60R 9/10 224/504 |
| 2008/0099522 A1 * | 5/2008 | Clausen | .................... | B60R 9/06 224/519 |
| 2014/0158729 A1 * | 6/2014 | Pedrini | ...................... | B60R 9/06 224/501 |
| 2017/0349111 A1 * | 12/2017 | Ramsdell | .................. | B60R 9/06 |
| 2018/0072237 A1 * | 3/2018 | Kuschmeader | ........... | B60R 9/10 |
| 2020/0156724 A1 * | 5/2020 | Kuschmeader | ........... | B62H 3/12 |
| 2021/0170955 A1 * | 6/2021 | Nusbaum | .................. | B60R 9/06 |
| 2022/0153205 A1 * | 5/2022 | Kuschmeader | ........... | B60R 9/06 |
| 2022/0176886 A1 * | 6/2022 | Sailer | ........................ | B60R 9/06 |
| 2022/0314895 A1 * | 10/2022 | Wärnelöv | .................. | B60R 9/06 |

* cited by examiner

*Primary Examiner* — Brian D Nash
(74) *Attorney, Agent, or Firm* — COOPER LEGAL GROUP, LLC

(57) ABSTRACT

Disclosed is a stable bicycle carrier at rear end of a vehicle including a rear rod, wherein one end of the rear rod from the vehicle is provided with a mounting piece, the mounting piece is provided with a beam, and both ends of the beam in its length direction are provided with wheel seats for accommodating wheels; the mounting piece includes a positioning rod and mounting rods at both ends of the positioning rod, the positioning rod is located at the middle of the beam, a side wall of the positioning rod away from the beam is connected with the rear rod; two of the mounting rods are located at a side wall of the positioning rod away from the rear rod, and a fixing component is provided between each of the mounting rods and the beam.

18 Claims, 13 Drawing Sheets

A-A

A

STABLE BICYCLE CARRIER AT REAR END OF VEHICLE

CROSS-REFERENCE TO RELATED APPLICATION

This application claims the priority and benefit of Chinese patent application serial no. 202220247563.0, filed on Jan. 31, 2022, and Chinese patent application serial no. 202222850275.7, filed on Oct. 26, 2022. The entireties of Chinese patent application serial no. 202220247563.0 and Chinese patent application serial no. 202222850275.7 are hereby incorporated by reference herein and made a part of this specification.

TECHNICAL FIELD

This application relates to a technical field of bicycle rack, and in particular, to a stable bicycle carrier at rear end of a vehicle.

BACKGROUND

At present, bicycles are widely used in people's daily life. People use bicycles for short distance travel and vehicles for long distance travel. Usually, people use a bicycle carrier at rear end of a vehicle, so as to carry bicycles when driving.

The prior art discloses a bicycle carrier at rear end of a vehicle with adjustable load capacity, including an underframe and several brackets on the underframe. The underframe includes a rear connector at the rear of the vehicle, a rear rod at one end of the rear connector and a connecting rod between the rear connector and the rear rod. The bracket includes a slidable sleeve which is slidably arranged on the connecting rod, wheel limiting pieces which are arranged on two sides of the slidable sleeve opposite to each other, a telescopic rod on one end of the slidable sleeve away from the rear connector and a crossbar limiting piece on the telescopic rod. The rear connector can be fixed at the rear of the vehicle by bolts, wherein two wheels of the bicycle can be placed inside two groups of wheel limiting pieces. The position of the crossbar limiting piece can be adjusted by the telescopic rod, and the crossbar of the bicycle can be fixed by the crossbar limiting piece, so that the bicycle can be quickly fixed at the rear of the vehicle.

In view of the above related technologies, the inventor found that there are at least the following problems in the technology: the bracket and the bicycle is mounted and fixed by a bicycle carrier through a connecting rod, wherein the bicycle carrier has a poor structural stability on the whole. When the vehicle bumps during driving, the bicycle and the bracket on the connecting rod tend to skew, so it needs to be improved.

SUMMARY

A stable bicycle carrier at rear end of a vehicle is disclosed, to improve the structural stability of the bicycle carrier and in turn to improve the connection stability between the bicycle and the rack.

In one aspect of the present disclosure, a stable bicycle carrier at rear end of a vehicle is disclosed, including a rear rod. One end of the rear rod away from the vehicle is provided with a mounting piece with a beam, and both ends of the beam in its length direction are provided with wheel seats for accommodating wheels. The mounting piece comprises a positioning rod and mounting rods at both ends of the positioning rod, the positioning rod is located at the middle of the beam, a side wall of the positioning rod away from the beam is connected with the rear rod. Two of the mounting rods are located at a side wall of the positioning rod away from the rear rod, and a fixing component is provided between each of the mounting rods and the beam.

When in use, the wheel can be pressed into the wheel seat, wherein the mounting rod improves support stability of the bicycle on the carrier and increases contact area with the beam. At the same time, two groups of mounting rods are connected with the beam through fixing components, respectively, which improves the connection stability between the mounting rods and the beam and the structural strength of the carrier on the whole, thus improving the support stability of the bicycle on the rack.

Preferably, the fixing component includes a fixing plate, which is arranged on a side wall of the beam away from each of the mounting rods; connecting plates, which are arranged at both ends of the fixing plate, wherein side walls of two of the connecting plates facing each other abut against an outer wall of the beam; butt plates, each of which is arranged at a side wall of a respective one of the connecting plates close to the mounting rods; and fasteners, each of which extends between a respective one of the butt plates and a respective one of the mounting rods, to fix the respective one of the butt plates on the respective one of the mounting rods.

Therefore, the connection stability between the mounting rods and the beam is improved, and the structural strength of the bracket on the whole is increased.

Preferably, one end of the rear rod close to the mounting rods is provided with two groups of adjusting plates. An adjusting rod is rotatably arranged between two of the adjusting plates. One end of the adjusting rod away from the adjusting plates is connected with the positioning rod. The adjusting rod is provided with a limiting component for limiting a relative position of the adjusting rod and the adjusting plates.

When in use, the adjusting rod is rotated around the adjusting plates, wherein a quickly positioning of the carrier is realized by the limiting component, so as to adjust the relative position of the carrier and the bicycle body, thereby realizing the retraction and expansion of the carrier and improving the practicability of the rack.

Preferably, the limiting component includes a slide rod, which is slidably arranged in the adjusting rod, one end of the slide rod away from the adjusting plates extends through the positioning rod, and the slide rod is slidable in a length direction of the adjusting rod; a limiting rod, which is arranged at one end of the slide rod close to the adjusting plates, wherein each of peripheral walls of two of the adjusting plates is provided with a plurality of limit notches configured to be pressed in by the limiting rod, and an outer wall of the adjusting rod is provided with a slide groove throughout the outer wall, in which the limiting rod slides in the length direction of the adjusting rod; and an elastic piece, which fits over the slide rod, wherein one end of the elastic piece abuts against the positioning rod, and the other end of the elastic piece abuts against the limiting rod, and the elastic piece can press the limiting rod into the limit notches by elastic force of the elastic piece itself.

When in use, the slide rod is pulled to drive the limiting rod out of the limit notches, and then the position of the adjusting rod can be adjusted. After the position adjustment has been completed, the slide rod can be released, such that pressure on the elastic piece will be reduced and the elastic piece elastically expanded, to push the limiting rod into the limit notches, so as to ensure that the limiting rod is snapped in the adjusting plates, and to ensure use stability of the limiting component.

In a second aspect, another kind of stable bicycle carrier at rear end of a vehicle is disclosed, including a rear rod, one end of the rear rod away from the vehicle is provided with a mounting piece with wheel seats for accommodating wheels, wherein one end of the rear rod close to the mounting piece is provided with two groups of adjusting plates, an adjusting rod is rotatably provided between two of the adjusting plates, with the adjusting rod being connected with the mounting piece. A driving component is provided between the adjusting rod and the adjusting plates, with the driving component being configured to adjust a relative position of the adjusting rod and the rear rod. A rotation gap is remained between the adjusting rod and the rear rod, wherein the rotation gap is provided for the adjusting rod, such that the adjusting rod can drive the mounting piece to rotate to the ground.

The driving component adjusts the relative position of the adjusting rod and the rear rod, which makes the adjusting rod rotate towards the ground. The adjusting rod drives the mounting piece and the bicycle to move towards the ground, so that the bicycle can keep a safe distance from the trunk, thus ensuring the normal opening and closing of the trunk and use convenience of the bicycle rack. Tilt of the adjusting rod and mounting piece can reduce the distance between the mounting piece and the ground, so as to facilitate access to the bicycle.

DESCRIPTION OF THE EMBODIMENTS

The present disclosure will be further described in detail below in combination with FIG. 1 to FIG. 13.

A stable bicycle carrier at rear end of a vehicle is disclosed.

Figure 1:
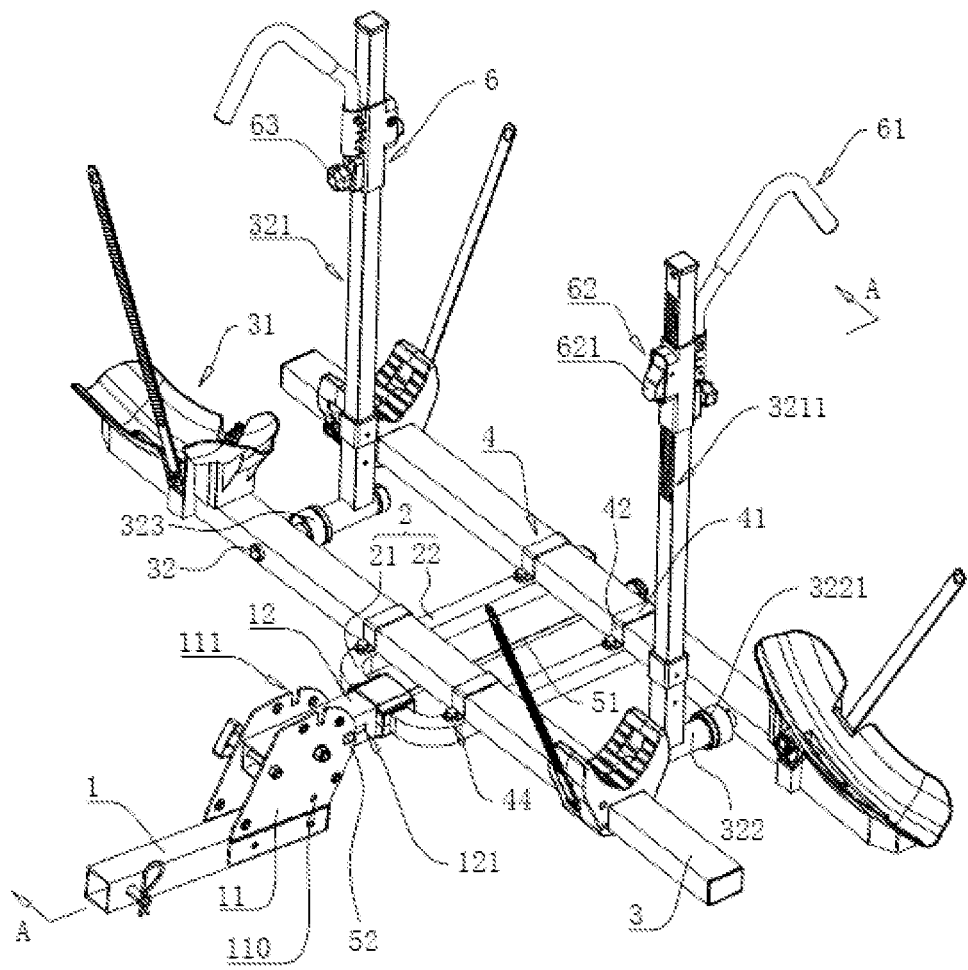
FIG. 1 is a structural diagram of the stable bicycle carrier at rear end of a vehicle in the embodiment of the present disclosure.
Figure 2:
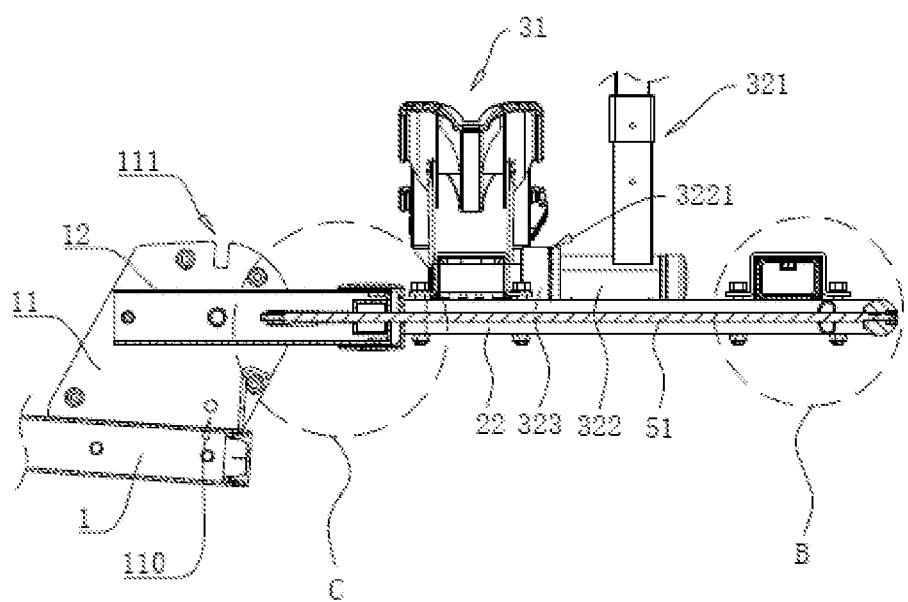
FIG. 2 is a sectional diagram in A-A direction of FIG. 1.

Referring to FIG. 1 and FIG. 2, a stable bicycle carrier at rear end of a vehicle comprises a rear rod 1 which is fixed by thread. Two adjusting plates 11 are welded on one end of the rear rod 1 away from the vehicle, between which an adjusting rod 12 is rotatably connected by a bearing pin. A bolt is threadedly connected between one end of the adjusting rod 12 close to the rear rod 1 and the two adjusting plates 11, to fixedly connect the adjusting rod 12 and the two adjusting plates 11.

A mounting piece 2 is fixedly connected to one end of the adjusting rod 12 away from the rear rod 1. The mounting piece 2 includes a positioning rod 21 and mounting rods 22. The positioning rod 21 extends through the end of the adjusting rod 12 away from the rear rod 1, and the adjusting rod 12 is welded and fixed at the middle of the positioning rod 21. The mounting rods 22 are welded and fixed at both ends of the positioning rod 21 in its length direction; are located on the side wall of the positioning rod 21 away from the adjusting rod 12; are perpendicular to the positioning rod 21, respectively; and are integrally connected with the two ends of the positioning rod 21 through an arc-shaped rod. The mounting piece 2 has a U-form. The positioning rod 21 and the mounting rods 22 are all hollow pipes with square cross section.

The upper surfaces of the two mounting rods 22 is jointly connected with a plurality of beams 3, and each beam 3 can be placed with bicycles. In this embodiment, the beams 3 are divided into two groups. The beams 3 are arranged with the adjusting rod 12 as the axis of symmetry and are perpendicular to the mounting rod 22. Each end of the beam 3 in its length direction is fixedly connected by bolts with a wheel seat 31 for placing a wheel. In this embodiment, wheel seats 31 of different models can be installed and replaced by screwing the bolts.

Figure 3:
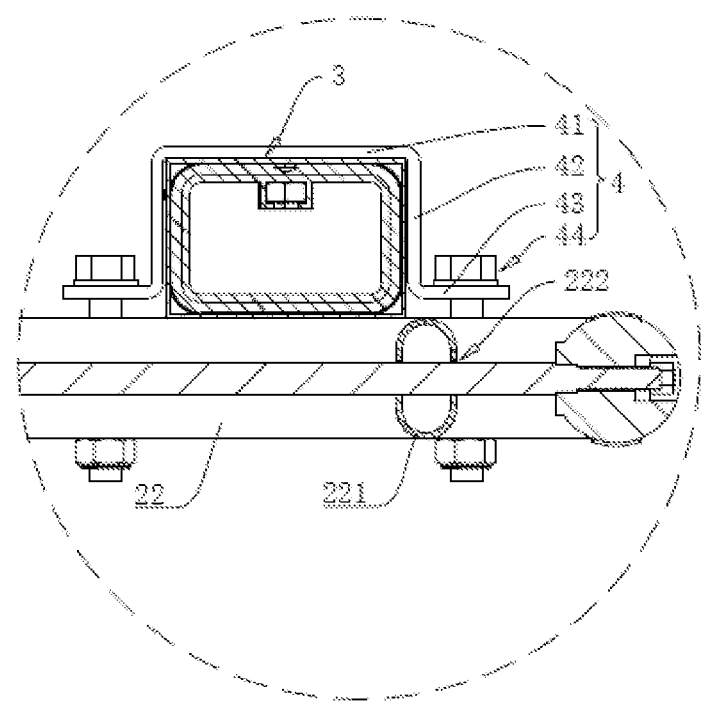
FIG. 3 is an enlarged diagram of part B in FIG. 2.

Referring to FIG. 1 and FIG. 3, a fixing component 4 is connected between each of the mounting rods 22 and a respective one of the beams 3, which includes a fixing plate 41, connecting plates 42, butt plates 43 and fasteners 44. In this embodiment, the fastener 44 is a bolt. The fixing plate 41 is located on the side wall of the beam 3 away from the mounting rod 22. The connecting plates 42 are integrally formed at both ends of t the fixing plate 41 in its length direction. Two connecting plates 42 are both located on the side walls of the fixing plate 41 close to the beam 3, and the side walls of the two connecting plates 42 facing each other abut against the outer wall of the beam 3.

The butt plate 43 is integrally formed at the end of the connecting plate 42 close to the mounting rod 22. The bolt in the fastener 44 penetrates the butt plate 43 and the mounting rod 22 simultaneously, and are threadedly connected with it through a nut, which abuts against the lower surface of the beam 3 to fix the butt plate 43 on the mounting rod 22, thus realizing a fixed connection between the beam 3 and the mounting rod 22.

Figure 4:
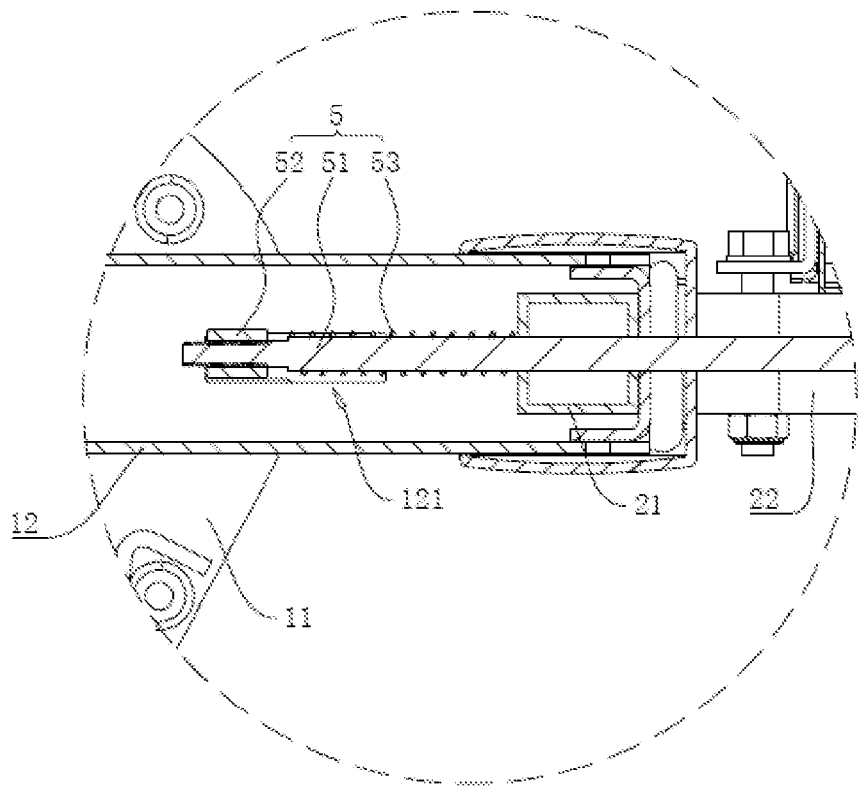
FIG. 4 is an enlarged diagram of part C in FIG. 2.

Referring to FIG. 1 and FIG. 4, two groups of access holes 110 for inserting bolts extend through two adjusting plates 11, one group of the access holes 110 is located at the end of the adjusting plate 11 away from the positioning rod 21, and the other group of the access holes 110 is located at the end of the adjusting plate 11 close to the rear rod 1. The adjusting rod 12 has a hollow structure. The adjusting rod 12 is internally connected with a limiting component 5, which is configured to adjust the relative position of the adjusting rod 12 and the adjusting plates 11.

The limiting component 5 includes a slide rod 51, a limiting rod 52 and an elastic piece 53. In this embodiment, the elastic piece 53 is a spring. The slide rod 51 is inserted inside the adjusting rod 12 and extends through the positioning rod 21 at the end away from the adjusting plates 11, so that the slide rod 51 can slide in the length direction of the adjusting rod 12 when pulling the slide rod 51.

The limiting rod 52 is threadedly connected to the end of the slide rod 51 close to the adjusting plates 11. A peripheral wall of each of the two adjusting plates 11 is provided with two groups of limit notches 111 configured to be pressed in by the limiting rod 52. One group of the limit notches 111 and one group of the access holes 110 are arranged on both ends of the adjusting plate 11 opposite to each other, while the other group of the limit notches 111 and the other group of access holes 110 are on both ends of the adjusting plate 11 opposite to each other.

When the adjusting rod 12 and the adjusting plates 11 rotate relative to each other, the limiting rod 52 is pressed into the limit notches 111 to limit the relative position of the adjusting rod 12 and the adjusting plates 11, and then bolts can be inserted into the corresponding access holes 110 to fixedly connect the adjusting plates 11 and the adjusting rod 12.

A slide groove 121 extends through the outer wall of the adjusting rod 12 to be passed through by the end of the limiting rod 52, so that the slide rod 51 can slide in the length direction of the adjusting rod 12 in the slide groove 121. The elastic piece 53 fits over the slide rod 51, wherein one end of the elastic piece 53 abuts against the side wall of the positioning rod 21 close to the limiting rod 52, and the other end thereof abuts against the side wall of the limiting rod 52 close to the positioning rod 21. The elastic piece 53 pushes the limiting rod 52 into the limit notches 111 by its own elastic force.

Referring to FIG. 1 and FIG. 3, a reinforcing rod 221 is welded an fixed between the two mounting rods 22, which is located at the end of the mounting rod 22 away from the positioning rod 21. A guide hole 222 extends through the side wall of the reinforcing rod 221 close to the slide rod 51, and the end of the slide rod 51 close to the reinforcing rod 221 extends through the guide hole 222 to move the slide rod 51 in the length direction of the adjusting rod 12.

Figure 5:
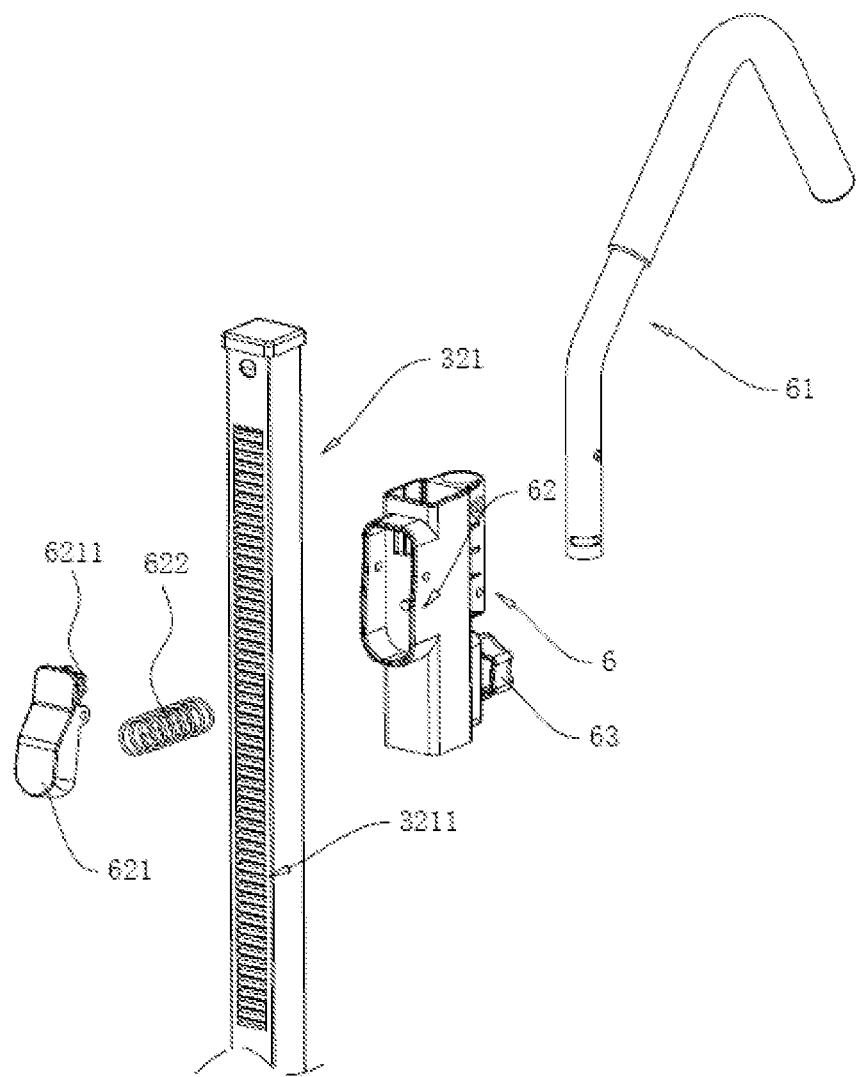
FIG. 5 is an exploded diagram to show position relationship of the limiting plates, the back shore, the upright rod, the slidable sleeve and the body rod.

Referring to FIG. 1 and FIG. 5, a fixing shaft 32 extends through the beam 3 at one end thereof in its length direction. The periphery of the fixing shaft 32 is rotatably connected with a rotation tube 322, whose peripheral wall is welded and fixedly with an upright rod 321. The end of the upright rod 321 away from the fixing shaft 32 is slidably connected with a slidable sleeve 6, and the side wall of the slidable sleeve 6 close to the wheel seat 31 is fixedly connected with a body rod 61 for fixing bicycle. The side wall of the slidable sleeve 6 close to the body rod 61 is threadedly connected with a fastening bolt 63, which abuts against the side wall of the upright rod 321 to increase the connection stability of the slidable sleeve 6 and the upright rod 321.

The side wall of the slidable sleeve 6 away from the body rod 61 is integrally formed with a mounting sleeve 62, which is internally rotatably connected with a limiting plate 621 through a bearing pin. The end of the limiting plate 621 close to the upright rod 321 is integrally formed with a limiting tooth 6211. The side wall of the upright rod 321 close to the limiting plate 621 is provided with meshing grooves 3211 that can be engaged with the limiting tooth 6211. The meshing grooves 3211 extend in the length direction of the upright rod 321.

A back shore 622 is connected between the end of the limiting plate 621 away from the limiting tooth 6211 and the inner wall of the slidable sleeve 6. In this embodiment, the back shore 622 is a compression spring. The back shore 622 can push the limiting tooth 6211 of the limiting plate 621 to continuously contact the meshing groove 3211 through its own elastic force.

Figure 6:
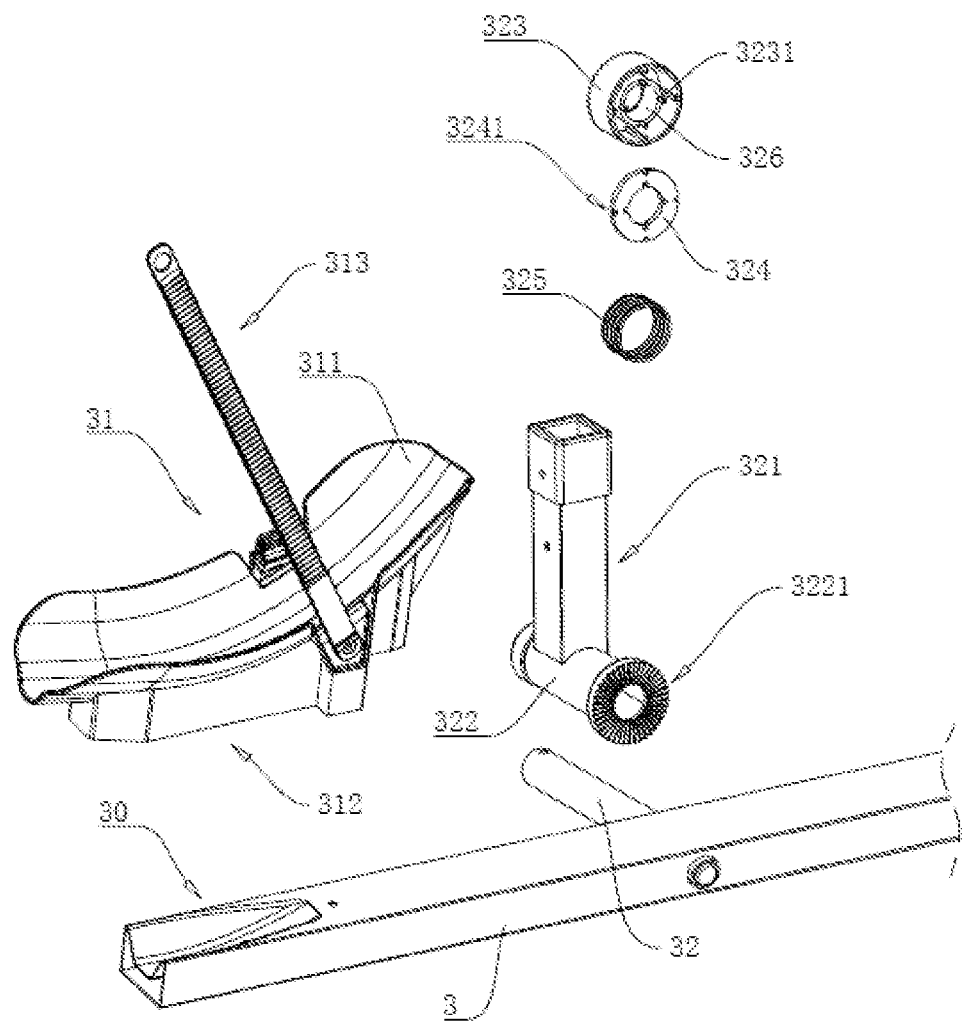
FIG. 6 is an exploded diagram to show position relationship of the fixing shaft, the rotation tube and the limiting tube.

Referring to FIG. 1 and FIG. 6, the periphery of the fixing shaft 32 is fixedly connected with a limiting tube 323, the end of which and the end of the rotation tube 322 that are close to each other abut against each other. The side walls of the rotation tube 322 and of the limiting tube 323 that abut against each other are each integrally formed with a butt tooth plate 3221 that limits rotation of the rotation tube 322. Two groups of butt tooth plates 3221 are in snap-fit relation with each other. When the limiting tube 323 is not subjected to an external force, the butt tooth plate 3221 rotation of the rotation tube 322. When the rotation tube 322 is forcefully rotated, the two groups of butt tooth plates 3221 rotate relative to each other, so as to adjust the connection angle between the upright rod 321 and the fixing shaft 32.

A fixing pipe 326 is integrally formed on the side wall of the butt tooth plate 3221 close to the fixing shaft 32. The fixing pipe 326 is located inside the limiting tube 323 and fixedly connected to the periphery of the fixing shaft 32. The end of the fixing pipe 326 away from the butt tooth plate 3221 is connected with a mounting ring plate 324, which is welded and fixed to the periphery of the fixing shaft 32 and is fixedly connected with the fixing pipe 326 by screws.

The mounting ring plate 324 is located inside the limiting tube 323, and a buffer 325 is connected between the mounting ring plate and the limiting tube 323. In this embodiment, the buffer 325 is a spring. The buffer 325 fits over the fixing pipe 326. One end of the buffer 325 abuts against the butt tooth plate 3221, and the other end thereof abuts against the mounting ring plate 324. When the rotation tube 322 rotates relative to the limiting tube 323, the buffer 325 can absorb a part of vibration force of the limiting tube 323 and the butt tooth plate 3221, thereby reducing damage to the limiting tube 323 and the butt tooth plate 3221 during rotation of the rotation tube 322.

Referring to FIG. 1 and FIG. 6, the inner wall of the limiting tube 323 is integrally formed with a plurality of limiting ribs 3231, each of which extends in the length direction of the limiting tube 323. The periphery of the mounting ring plate 324 is provided with a plurality of limiting notches 3241 fitting with the limiting ribs 3231. The limiting ribs 3231 abut against the inner walls of the limiting notches 3241 to limit the rotation of the limiting tube 323 relative to the fixing shaft 32.

Figure 7:
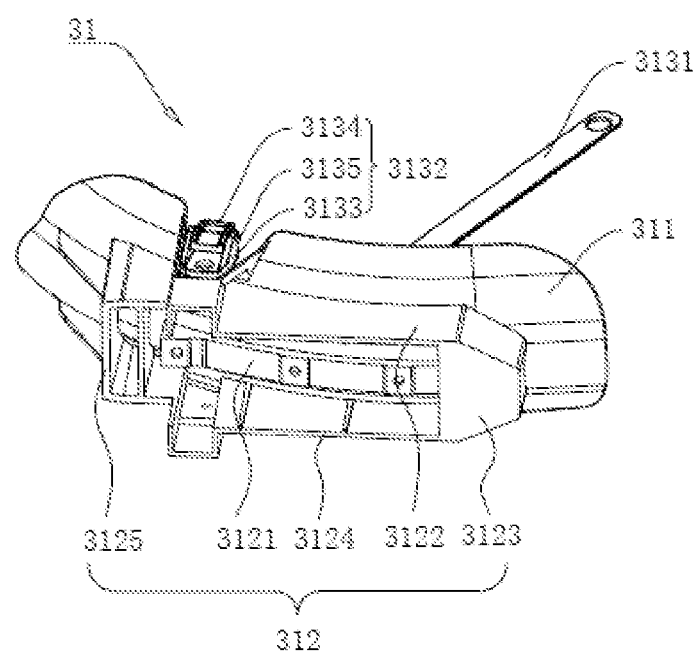
FIG. 7 is a diagram to show the concrete structure of the wheel seat.

Referring to FIG. 6 and FIG. 7, each wheel seat 31 includes an arc-shaped receiver 311, a connection part 312 is integrally connected to the lower part of the arc-shaped receiver 311, and a bandage structure 313. The arc-shaped receiver 311 is an arc-shaped plate whose upper surface is concaved downward, and the radian of the upper surface of the arc-shaped receiver 311 adapts to the radian of the wheel to receive the wheel.

The connection part 312 includes a fixing seat and a connecting block 3121. The fixing seat includes a first side plate 3122, a stop block 3123, a second side plate 3124, a butt block 3125 protruding downward from the bottom surface of the arc-shaped receiver 311, which are connected end to end to form a mounting cavity for mounting the end of the beam 3. The connecting block 3121 is a long strip protruding downward from the bottom surface of the arc-shaped receiver 311. The connecting block 3121 is provided with a connecting hole through the arc-shaped receiver 311. The side wall of the beam 3 close to the wheel seat 31 is provided with an abdicating notch 30 to be embedded by the lower part of the arc-shaped receiver 311, so as to press the wheel seat 31 into the abdicating notch 30, thus increasing connection stability of the wheel seat 31 and the beam 3. When the wheel seat 31 is installed at the end of the beam 3, the end of the beam 3 is inserted in the mounting cavity, the first side plate 3122 and the second side plate 3124 abuts against both sides of the beam 3, respectively, the stop block 3123 abuts against the end face of the beam 3, the lower end face of the butt block 3125 abuts against the top surface of the beam 3, and the wheel seat is fixedly connected with the beam 3 by the screw 3126 which extends through the connecting hole.

Figure 8:
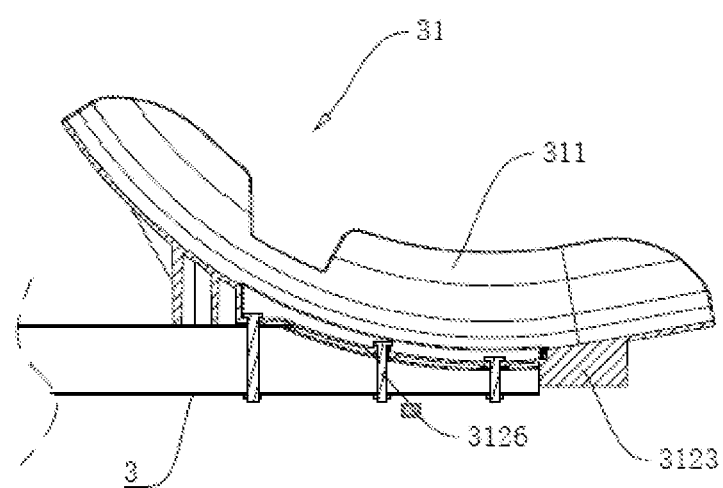
FIG. 8 is a sectional diagram to show the connection between the wheel seat and the beam.

Referring to FIG. 7 and FIG. 8, the bandage structure 313 includes a bandage 3131 and a locking buckle 3132. One end of the bandage 3131 is fixedly connected to the outer wall of one side of the arc-shaped receiver 311, and the other end thereof is a movable end. The bandage 3131 is provided with a number of convex teeth in its length direction. The locking buckle 3132 includes a buckle seat 3133, a locking block 3134, a hinge shaft 3135 and a compression and torsion spring 3136. The buckle seat 3133 is fixedly connected to the outer wall of the other side of the arc-shaped receiver 311 through screws. The side surface of the buckle seat 3133 away from the arc-shaped receiver 311 is provided with a locking groove that extends throughout the buckle seat from top to bottom. The two ends of the hinge shaft 3135 are respectively installed on the side walls of both sides of the locking groove, and the middle part of the locking block 3134 is rotatably connected to the hinge shaft 3135. The torsion spring is sleeved over the hinge shaft 3135. One foot of the torsion spring is fixedly connected to the side wall of the locking groove, and the other foot thereof abuts against the locking block 3134. The torsion spring provides a compression force that continuously moves the lower end of the locking block 3134 towards the bottom of the locking groove. Two sides of the arc-shaped supporting plate are respectively provided with openings, the locking buckle 3132 and bandage 3131 are respectively located on the outer wall at the opening of the two sides of the arc-shaped receiver 311. When it is necessary to bind, the user may press the upper end of the locking block 3134 towards the locking groove for a certain distance. The movable end of the bandage 3131 bridges the arc-shaped receiver 311 from above and extends through the locking groove from top to bottom. when the bandage 3131 is in position, the user may release the upper end of the locking block 3134, such that the lower end of the locking block 3134 abuts against the gap between two adjacent convex teeth on the bandage 3131 to fix the bandage 3131, so as to bind and fix the wheel located in the arc-shaped receiver 311.

The implementation principle of the present embodiment is as follows:

When it is necessary to adjust the relative position of the carrier and the vehicle, the user may unscrew and remove the bolts inside the access holes 110 and pull the slide rod 51, such that the limiting rod 52 presses the elastic piece 53 to slide away from the adjusting plates 11, thereby the limiting rod 52 is disengaged from the limit notches 111. And then the adjusting rod 12 can rotate relative to the adjusting plates 11 to adjust the connection angle between the adjusting rod 12 and the rear rod 1. Then the user may release the slide rod 51, thereby the pressure on the elastic piece 53 is reduced and the elastic piece will expand, to press the limiting rod 52 into the limit notches 111 for rapid positioning of the adjusting plates 11 and the adjusting rod 12. Then the user can screw the bolt into the corresponding access holes 110 on the adjusting plates 11 at this time to realize a quick fixation of the adjusting rod 12 and the rear rod 1.

When the limiting rod 52 is pressed into the limit notches 111 at the end of the adjusting plates 11 away from the rear rod 1, the carrier can be stored to save the space occupied by the rack. When the limiting rod 52 is pressed into another group of the limit notches 111 of the adjusting plates 11, the carrier can be quickly expanded to place a bicycle.

When it is necessary to adjust the relative position of the body rod 61 and the upright rod 321, the user can first unscrew the bolt at the outer wall of the slidable sleeve 6, and then press the end of the limiting plate 621 away from the limiting teeth 6211, such that the back shore 622 will be elastically contracted under pressure, thereby the limiting teeth 6211 will be disengaged from the meshing grooves 3211. At this time, the user can move the slidable sleeve 6 in the length direction of the upright rod 321 to adjust the relative position of the body rod 61 and the upright rod 321.

After adjustment, the user may release the limiting plate 621, thus the pressure on the back shore 622 is reduced and the back shore elastic expands to push the end of the limiting plate 621 with the limiting teeth 6211 to rotate towards the meshing grooves 3211, realizing a quick positioning and fixed connection between the slidable sleeve 6 and the upright rod 321. Finally, the user can screw the bolt at the outside of the slidable sleeve 6, to increase connection stability between the slidable sleeve 6 and the upright rod 321.

When it is necessary to adjust the angle between the upright rod 321 and the fixing shaft 32, the user may hold the upright rod 321 and turn it to make the two butt tooth plates 3221 abutting against each other rotate rigidly relative to each other. After the rotation, the two butt tooth plates 3221 abutting against each other are engaged with each other, to limit the position of the upright rod 321 and the fixing shaft 32, realizing a rapid adjustment of the angle between the upright rod 321 and the fixing shaft 32.

Embodiment 2

Figure 9:
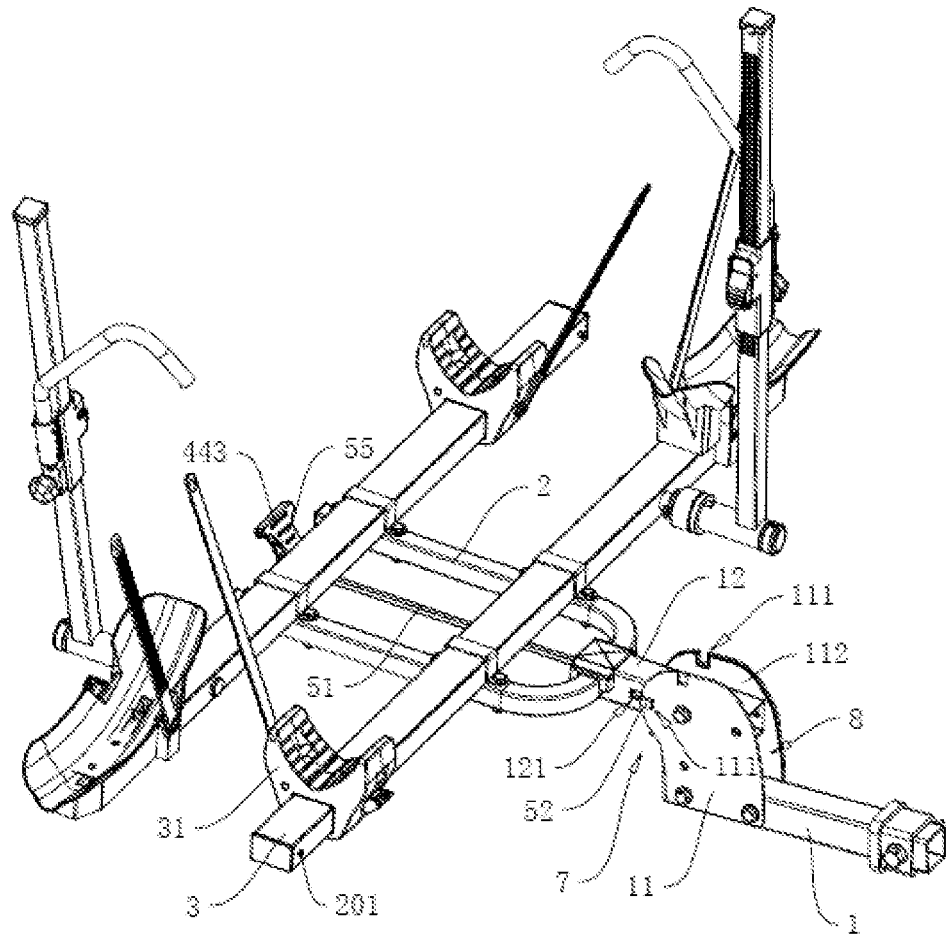
FIG. 9 is a structural diagram of the stable bicycle carrier at rear end of a vehicle in the embodiment of the present disclosure.
Figure 10:
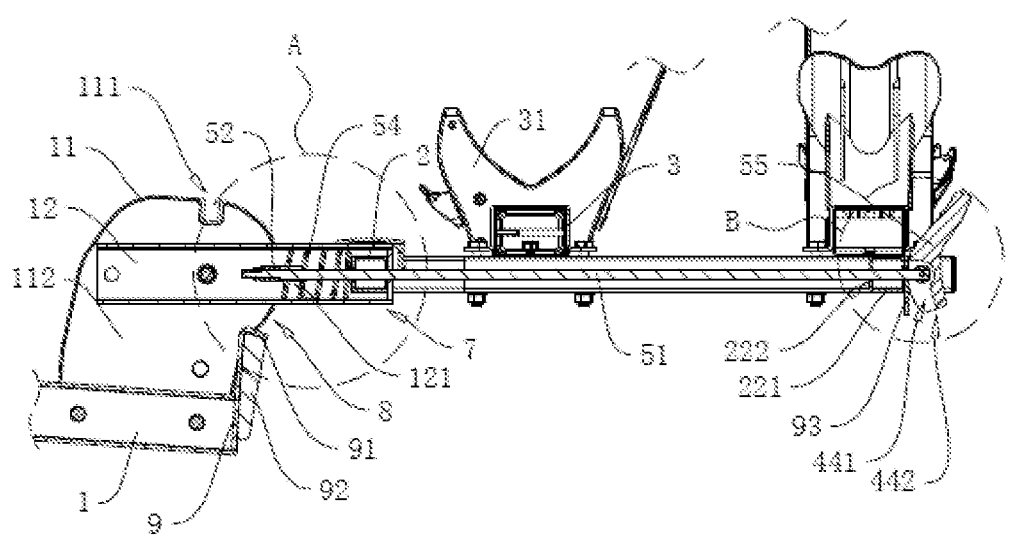
FIG. 10 is a sectional diagram to show the connection relationship between the adjusting rod and the driving component.

Referring to FIG. 9 and FIG. 10, a rotation gap 8 is remained between the adjusting rod 12 and the rear rod 1, such that the adjusting rod 12 can rotate towards the ground. A driving component 7 is installed between the adjusting rod 12 and the adjusting plates 11 to adjust the relative position between the adjusting rod 12 and the rear rod 1, so as to adjust the distance between the bicycle and the trunk.

Figure 11:
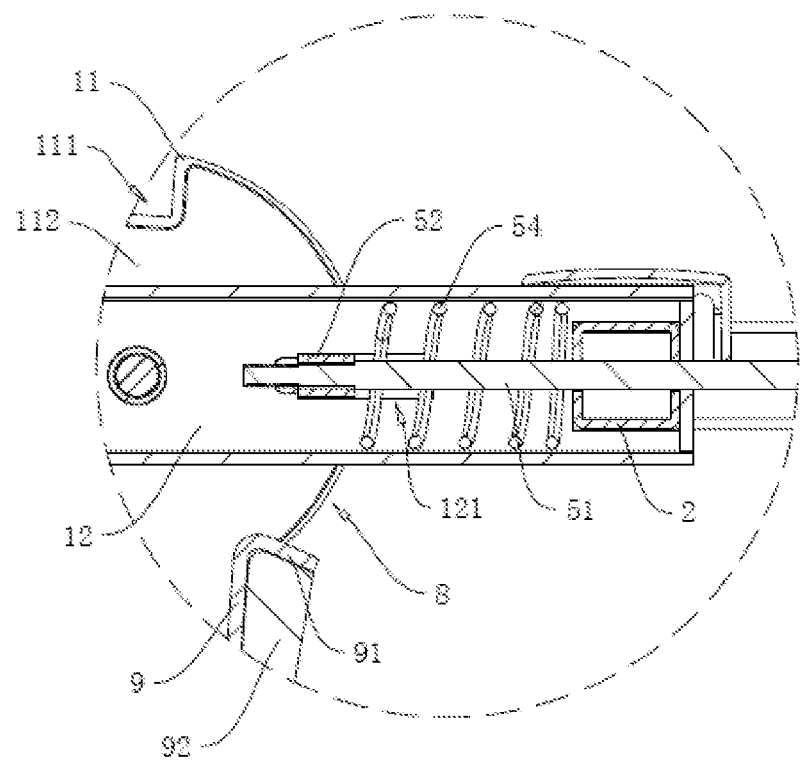
FIG. 11 is an enlarged diagram to represent the structure at part A in FIG. 2.

Referring to FIG. 10 and FIG. 11, the driving component 7 includes a slide rod 51, a limiting rod 52, a reset piece 54 and a trigger block 55. The slide rod 51 is slidably installed inside the adjusting rod 12, whose sliding direction is parallel to the length direction of the adjusting rod 12. The end of the slide rod 51 away from the adjusting plates 11 is located between the mounting pieces 2. In this embodiment, the slide rod 51 is a square rod, and the slide rod 51 and the adjusting rod 12 are mutually matched at joint to reduce shaking of the slide rod 51 during sliding.

In this embodiment, the reset piece 54 is a reset spring. The reset piece 54 is sleeved over the adjusting rod 12. One end of the reset piece 54 in its length direction abuts against the limiting rod 52, and the other end thereof abuts against the mounting piece 2. The telescopic direction of the reset piece 54 is parallel to the length direction of the adjusting rod 12, so that the reset piece 54 can push the limiting rod 52 to move towards the adjusting plates 11 through its own elastic force, so that the limiting rod 52 can stably lie in the limit notches 111.

Figure 12:
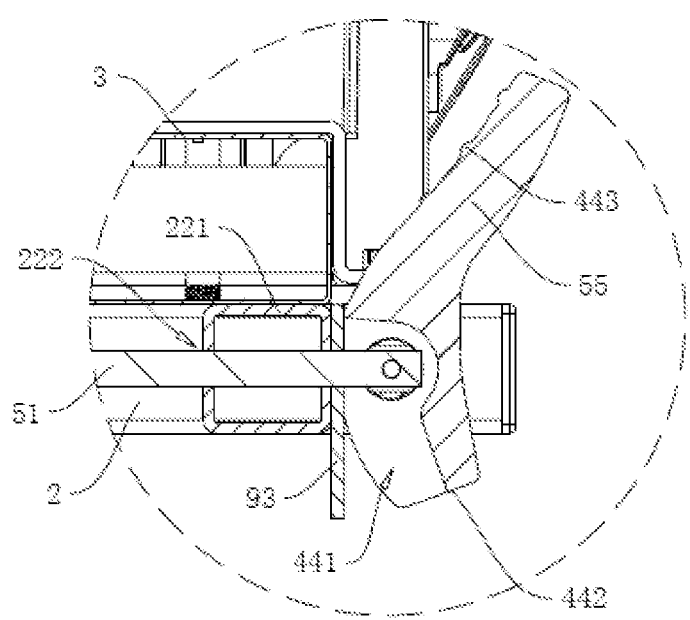
FIG. 12 is an enlarged diagram to represent the structure at part B in FIG. 2.

Referring to FIG. 10 and FIG. 12, the trigger block 55 is rotatably connected to the end of the slide rod 51 away from the adjusting plates 11 through a bearing pin, and the side wall of the trigger block 55 is provided with a rotation gap 441 to be rotated into by the slide rod 51. Both ends of the trigger block 55 in its length direction are bent away from the slide rod 51. The side wall of the trigger block 55 close to the slide rod 51 is integrally formed with several anti-slip flanges 443 to increase the friction coefficient of the surface of the trigger block 55. The end wall of the end of the trigger block 55 close to the ground is provided with a flat butt surface 442.

The end of the mounting piece 2 away from the rear rod 1 is welded and fixed with a reinforcing rod 221. The reinforcing rod 221 is provided with a guide hole 222 extending throughout it to be passed through by one end of the slide rod 51 away from the adjusting rod 12. In this embodiment, the guide hole 222 is a square hole adapted to the reinforcing rod 221, thus reducing the shaking phenomenon of the slide rod 51 during sliding.

The trigger block 55 is located on the side of the reinforcing rod 221 away from the adjusting rod 12, and the side wall of the reinforcing rod 221 close to the trigger block 55 is welded and fixed with a fixing block 93. The end of the slide rod 51 close to the trigger block 55 extends through the fixing block 93, and the trigger block 55 abuts against the fixing block 93.

When foot treads on the end of the trigger block 55 away from the ground, the trigger block 55 abuts against the fixing block 93 and rotate to pull the slide rod 51 and the limiting rod 52 to move away from the adjustment plates 11, so as to rotate the adjusting rod 12 and the mounting piece 2. When the butt surface 442 of the trigger block 55 abuts against the fixing block 93, they can be in a stable abutting state, so as to keep the limiting rod 52 in the state of releasing away from the limit notches 111, so as to rotate the adjusting rod 12.

Referring to FIG. 10 and FIG. 11, the end of the rear rod 1 close to the mounting piece 2 is welded and fixed with an extension plate 9, and the end of the extension plate 9 close to the adjusting rod 12 is bent to form a supporting plate 91 for supporting the adjusting rod 12. A reinforcing plate 92 is welded and fixed between the extension plate 9 and the supporting plate 91 to increase structural strength between them.

Referring to FIG. 9 and FIG. 11, the side walls of two groups of adjusting plates 11 facing each other are glued with inner liners 112. In this embodiment, the inner liner 112 is made of plastic. The side walls of the two groups of inner liners 112 facing each other respectively abut against the adjusting rod 12, so as to reduce hard friction between the adjusting rod 12 and the adjusting plates 11 during rotation of the adjusting rod 12.

Figure 13:
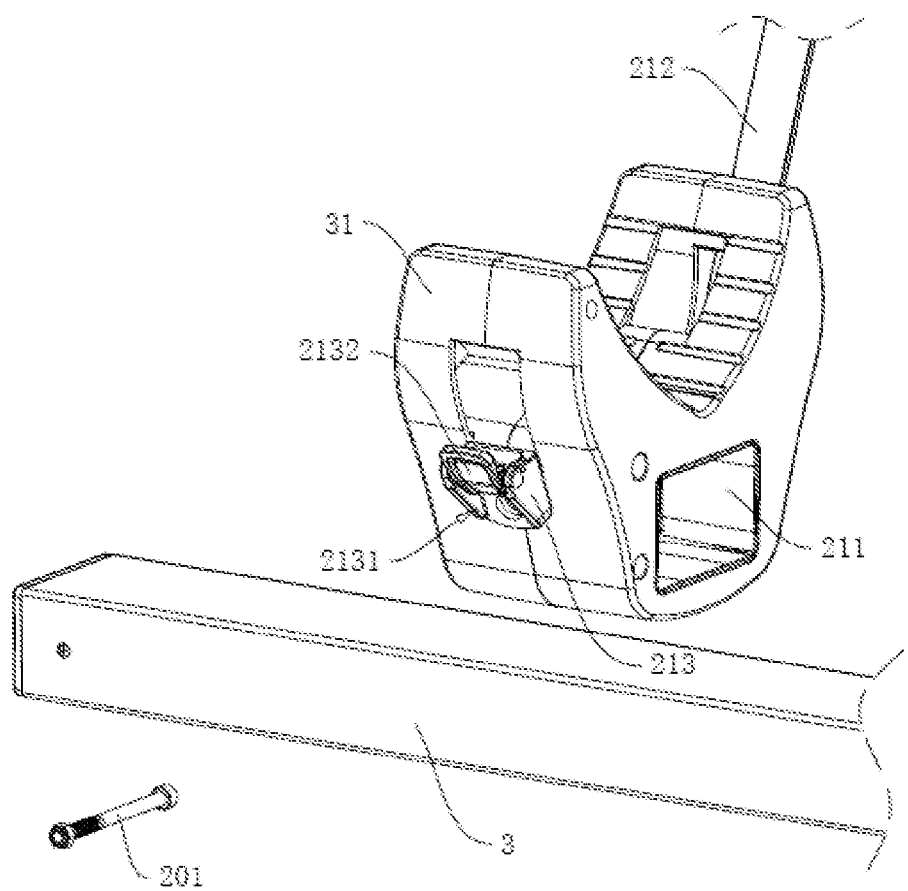
FIG. 13 is an exploded diagram to show the connection relationship between the beam and the wheel seat.

Referring to FIG. 9 and FIG. 13, in this embodiment, the wheel seat 31 is sleeved over the beam 3, and inside of the wheel seat 31 is integrally formed with a butt arc-shaped surface 211 leaning against the outer wall of the beam 3. The butt arc-shaped surface 211 increases the contact area between the wheel seat 31 and the beam 3, thus improving connection stability between the wheel seat 31 and the beam 3. The end of the beam 3 is threaded with a limiting bolt 201, wherein contact between the limiting bolt 201 and the wheel seat 31 prevents the wheel seat 31 from removing from the beam 3.

Referring to FIG. 13, one side of the wheel seat 31 is fixedly connected with a restraining band 212, and the other side is connected with a clamp seat 213 through a screw. The side wall of the clamp seat 213 away from the wheel seat 31 is provided with a recess 2131. A latch 2132 is rotatably connected in the recess 2131 through a rotation shaft and a torsion spring. A space is remained between the latch 2132 and the clamp seat 213 to be passed through by the restraining band 212. In this embodiment, the torsion spring is configured to drive the latch 2132 to rotate around the rotation shaft and to contact the clamp seat 213. The latch 2132 abuts against the inner wall of recess 2131 to limit the rotation direction of the latch 2132 to reduce shaking of the latch 2132. The restraining band 212 is passed through the wheel and inserted into the space between the latch 2132 and the clamp seat 213. The latch 2132 is driven to clamp and fix the restraining band 212 in the recess 2131 through the torsion spring, so as to quickly fix the wheel on the wheel seat 31.

The implementation principle is as follows:

Treading on the trigger block 55 with foot, so that the trigger block 55 abuts against the fixing block 93 and rotates. The rotating trigger block 55 drives the slide rod 51 and the limiting rod 52 to move away from the adjusting plates 11, such that the reset piece 54 contracts elastically under pressure.

When the butt surface 442 abuts against the fixing block 93, the tension on the trigger block 55 exerted by the reset piece 54 holds the trigger block 55 in a stable abutting state with the fixing block 93, such that the limiting rod 52 is released from the limit notches 111, so that the adjusting rod 12 and the adjusting plates 11 can rotate relative to each other.

Holding the mounting piece 2, such that the adjusting rod 12 and the mounting piece 2 gradually turn towards the ground under their own gravity, and the mounting piece 2 moves the loaded bicycle away from the trunk gradually. The supporting plate 91 abuts against the adjusting rod 12 and supports the adjusting rod 12 to realize a stable tilt of the mounting piece 2, so as to keep a safe distance of the bicycle on the mounting piece 2 from the vehicle trunk, so as to ensure a normal opening and closing of the trunk.

After the trunk has been opened and closed, the user can hold the mounting piece 2, and then move the trigger block 55 to rotate with the foot, so that the butt surface 442 is out of the stable abutting with the fixing block 93, and then the trigger block 55 rotates back and returns to its original state. The user can turn the adjusting rod 12 so that the slide groove 121 is aligned with the limit notches 111, and the reset piece 54 pushes the limiting rod 52 to move towards the adjusting plates 11 through its own elastic force, and presses the limiting rod 52 into the limit notches 111 again, thus realizing a fixing connection between the adjusting rod 12 and the adjusting plate 11.

What is claimed is:

1. A bicycle carrier at rear end of a vehicle, comprising a rear rod, wherein
one end of the rear rod away from the vehicle is provided with a mounting piece with a beam, and both ends of the beam in a length direction of the beam are provided with wheel seats for accommodating wheels;
the mounting piece comprises a positioning rod and mounting rods at both ends of the positioning rod, the positioning rod is located at a middle of the beam, and a side wall of the positioning rod away from the beam is connected with the rear rod; and
two of the mounting rods are located at a side wall of the positioning rod away from the rear rod, and a fixing component is provided between each of the mounting rods and the beam;

wherein the fixing component comprises:
a fixing plate arranged on a side wall of the beam away from each of the mounting rods;
connecting plates arranged at both ends of the fixing plate, wherein side walls of two of the connecting plates facing each other abut against an outer wall of the beam;
butt plates, each of which is arranged at a side wall of a respective one of the connecting plates close to the mounting rods; and
fasteners, each of which extends between a respective one of the butt plates and a respective one of the mounting rods, to fix the respective one of the butt plates on the respective one of the mounting rods.

2. The bicycle carrier at rear end of a vehicle according to claim 1, wherein
one end of the rear rod close to the mounting rods is provided with two groups of adjusting plates;
an adjusting rod is rotatably arranged between two of the adjusting plates;
one end of the adjusting rod away from the adjusting plates is connected with the positioning rod; and
the adjusting rod is provided with a limiting component for limiting a relative position of the adjusting rod and the adjusting plates.

3. The bicycle carrier at rear end of a vehicle according to claim 2, wherein the limiting component comprises:
a slide rod slidably arranged in the adjusting rod, one end of the slide rod away from the adjusting plates extends through the positioning rod, and the slide rod is slidable in a length direction of the adjusting rod;
a limiting rod arranged at one end of the slide rod close to the adjusting plates, wherein each of peripheral walls of two of the adjusting plates is provided with a plurality of limit notches configured to receive the limiting rod, and an outer wall of the adjusting rod is provided with a slide groove throughout the outer wall, in which the limiting rod slides in the length direction of the adjusting rod; and
an elastic piece sleeved on the slide rod, wherein a first end of the elastic piece abuts against the positioning rod, and a second end of the elastic piece abuts against the limiting rod, and the elastic piece is configured to press the limiting rod into the limit notches.

4. The bicycle carrier at rear end of a vehicle according to claim 3, wherein a reinforcing rod is provided between two of the mounting rods, and an outer wall of the reinforcing rod is defined with a guide hole throughout the outer wall configured to be passed through by the slide rod.

5. The bicycle carrier at rear end of a vehicle according to claim 1, wherein
one end of the beam is provided with a fixing shaft provided with an upright rod;
one end of the upright rod away from the fixing shaft is slidably provided with a slidable sleeve;
an outer wall of the slidable sleeve is provided with a body rod configured for fixing a bicycle body and a mounting sleeve;
a limiting plate for adjusting a position of the body rod is rotatably arranged in the mounting sleeve;
one end of the limiting plate close to the upright rod is provided with a limiting tooth, and an outer wall of the upright rod is provided with a meshing groove configured to be in snap-fit connection with the limiting tooth; and
one end of the limiting plate away from the limiting tooth is provided with a back shore, which can drive the limiting tooth to abut against the meshing groove due to elastic force of the back shore.

6. The bicycle carrier at rear end of a vehicle according to claim 5, wherein a side wall of the slidable sleeve away from the mounting sleeve is threaddedly connected with a fastening bolt, one end of the fastening bolt facing the mounting sleeve is configured to extend through the slidable sleeve and abut against the outer wall of the upright rod.

7. The bicycle carrier at rear end of a vehicle according to claim 5, wherein
a periphery of the fixing shaft is rotatably provided with a rotation tube, and a peripheral wall of the rotation tube is connected with the upright rod;
the periphery of the fixing shaft is provided with a limiting tube abutting against the rotation tube; and
side walls of the rotation tube and the limiting tube abutting against each other are each provided with a butt tooth plate configured to limit rotation of the rotation tube.

8. The bicycle carrier at rear end of a vehicle according to claim 7, wherein the periphery of the fixing shaft is provided with a mounting ring plate positioned in the limiting tube, and a buffer is provided between the mounting ring plate and the butt tooth plate.

9. The bicycle carrier at rear end of a vehicle according to claim 8, wherein an inner wall of the limiting tube is provided with a plurality of limiting ribs, and a periphery of the mounting ring plate is provided with limiting notches configured to abut against the limiting ribs.

10. The bicycle carrier at rear end of a vehicle according to claim 1, wherein
a side wall of each of the wheel seats close to the beam is provided and fixed with a connection part for mounting a respective one of the wheel seats through a bolt; and
a side wall of the beam close to a respective one of the wheel seats is provided with an abdicating notch configured to be inserted in by a respective one of the wheel seats.

11. A bicycle carrier at rear end of a vehicle, comprising a rear rod, wherein
one end of the rear rod away from the vehicle is provided with a mounting piece with wheel seats for accommodating wheels,
one end of the rear rod close to the mounting piece is provided with two groups of adjusting plates, an adjusting rod is rotatably provided between two of the adjusting plates, and the adjusting rod is connected with the mounting piece;
a driving component is provided between the adjusting rod and the adjusting plates, and the driving component is configured to adjust a relative position of the adjusting rod and the rear rod;
a rotation gap is reserved between the adjusting rod and the rear rod, wherein the rotation gap is provided for the adjusting rod to drive the mounting piece to rotate toward a ground;
the one end of the rear rod close to the mounting piece is provided with an extension plate;
one end of the extension plate close to the adjusting rod is provided with a supporting plate for supporting the adjusting rod; and
a reinforcing plate is provided between the extension plate and the supporting plate.

12. The bicycle carrier at rear end of a vehicle according to claim 11, wherein the driving components comprises:
- a slide rod slidably arranged in the adjusting rod in a length direction of the adjusting rod;
- a limiting rod arranged at one end of the slide rod close to the rear rod, wherein the adjusting rod is provided with a slide groove throughout the adjusting rod for the limiting rod, such that the limiting rod can slide in the slide groove in the length direction of the adjusting rod, and each of the adjusting plates is provided with several limit notches to be inserted in by the limiting rod;
- a reset piece on the slide rod, wherein a first end of the reset piece is connected with the limiting rod, a second end of the reset piece is connected with the mounting piece, and the reset piece is configured to drive the limiting rod to move towards the adjusting plates; and
- a trigger block on the slide rod configured to drive the slide rod to move in a direction of the adjusting rod.

13. The bicycle carrier at rear end of a vehicle according to claim 12, wherein the mounting piece is provided with a reinforcing rod, and the reinforcing rod is provided with a guide hole throughout the reinforcing rod to be extended through by the slide rod.

14. The bicycle carrier at rear end of a vehicle according to claim 13, wherein the trigger block is rotatably connected with the slide rod, the trigger block is provided with a rotation gap adaptive for rotation of the slide rod, and the trigger block abuts against a side wall of the reinforcing rod away from the rear rod.

15. The bicycle carrier at rear end of a vehicle according to claim 14, wherein a side wall of the reinforcing rod close to the trigger block is provided with a fixing block configured to abut against the trigger block.

16. The bicycle carrier at rear end of a vehicle according to claim 15, wherein one end of the trigger block close to the ground is provided with a butt surface configured to abut against the fixing block.

17. The bicycle carrier at rear end of a vehicle according to claim 14, wherein both ends of the trigger block in a length direction of the trigger block are bent to a direction away from the reinforcing rod, and a side wall of the trigger block is provided with anti-slip flanges.

18. A bicycle carrier at rear end of a vehicle, comprising a rear rod, wherein
- one end of the rear rod away from the vehicle is provided with a mounting piece with a beam, and both ends of the beam in a length direction of the beam are provided with wheel seats for accommodating wheels;
- the mounting piece comprises a positioning rod and mounting rods at both ends of the positioning rod, the positioning rod is located at a middle of the beam, and a side wall of the positioning rod away from the beam is connected with the rear rod;
- two of the mounting rods are located at a side wall of the positioning rod away from the rear rod, and a fixing component is provided between each of the mounting rods and the beam;
- one end of the rear rod close to the mounting rods is provided with two groups of adjusting plates;
- an adjusting rod is rotatably arranged between two of the adjusting plates;
- one end of the adjusting rod away from the adjusting plates is connected with the positioning rod; and
- the adjusting rod is provided with a limiting component for limiting a relative position of the adjusting rod and the adjusting plates.

\* \* \* \* \*